United States Patent
Fischer

(10) Patent No.: US 6,866,071 B2
(45) Date of Patent: Mar. 15, 2005

(54) DUSTLESS STACKER METHOD AND APPARATUS FOR A BULK SOLIDS HANDLING AND STORAGE SYSTEM

(75) Inventor: John S. Fischer, Boulder, CO (US)

(73) Assignee: Air Control Science, Inc., Boulder, CO (US)

(*) Notice: Subject to any disclaimer, the term of this patent is extended or adjusted under 35 U.S.C. 154(b) by 87 days.

(21) Appl. No.: 10/360,904

(22) Filed: Feb. 7, 2003

(65) Prior Publication Data

US 2004/0154691 A1 Aug. 12, 2004

(51) Int. Cl.[7] .................................................. B65B 1/04
(52) U.S. Cl. ..................... 141/59; 141/67; 141/286; 193/25 C; 193/30; 414/291
(58) Field of Search ................. 141/59, 67, 286, 141/98; 222/152; 193/25 C, 30; 414/291, 299

(56) References Cited

U.S. PATENT DOCUMENTS

| | | |
|---|---|---|
| 1,021,757 A | 4/1912 | Blaisdell |
| 1,045,359 A * | 11/1912 | Babbitt, Jr. .................. 126/242 |
| 3,241,581 A | 3/1966 | Richardson et al. |
| 3,738,464 A | 6/1973 | Ortlip et al. |
| 3,739,893 A | 6/1973 | Kaufman |
| 3,867,969 A | 2/1975 | Garnett |
| 4,061,221 A | 12/1977 | Higashinaka et al. |
| 4,248,277 A | 2/1981 | Hanrot et al. |
| 4,557,364 A * | 12/1985 | Ball .......................... 193/25 C |
| 4,727,913 A | 3/1988 | Bliss |

FOREIGN PATENT DOCUMENTS

| | | |
|---|---|---|
| FR | 2704215 A1 | 10/1994 |
| JP | 52095460 | 8/1977 |
| JP | 357170302 A | 10/1982 |

* cited by examiner

Primary Examiner—Steven O. Douglas
(74) Attorney, Agent, or Firm—Duft Setter Ollila & Bornsen LLC

(57) ABSTRACT

A Dustless Stacker hood for suppressing dust generated during the stockpiling of materials such as coal. The Dustless Stacker hood receives coal from overhead chute; the received coal falls through Dustless Stacker hood to the top of a stockpile, and the Dustless Stacker hood confines dust inside Dustless Stacker hood. The dust-laden air swirls within the Dustless Stacker hood through a recirculation pipe and back to the overhead chute to enhance an agglomeration process which causes the dust particles stick together and fall to the top of stockpile.

23 Claims, 3 Drawing Sheets

DUSTLESS STACKER METHOD AND APPARATUS FOR A BULK SOLIDS HANDLING AND STORAGE SYSTEM

FIELD OF THE INVENTION

The present invention relates to a Dustless Stacker hood for suppressing dust generated during the stockpiling of materials such as coal.

PROBLEM

Air pollution remains one of the most substantial problems facing today's industrial society. Air pollution partly causes many environmental problems, such as the Greenhouse Effect, and many health ailments, such as silicosis, pneumoconiosis, emphysema, and some forms of asthma. One source of air pollution is dust comprised of particles of a bulk material, such as coal. The Occupational Safety and Health Administration (OSHA) limits the dust exposure of workers involved with mining, grinding, crushing, or transportation of materials. In addition to the environmental and health problems caused by the production of dust, society generally views the release of dust into the atmosphere as a public and private nuisance. For these reasons, the government has increasingly sought to regulate dust particulate emissions. Industries involved with handling bulk materials have also sought to reduce the amount of dust released into the air.

Stockpiling of bulk material such as coal, rocks, or cement, or any crushed particulate material, produces a high output of dust particles. Coal is stockpiled and stored for future use or transport. A stackout conveyor is located above the storage area onto which the coal is to be stockpiled. As the chunks of coal fall off of the conveyor, they typically fall through a chute and onto the storage area. As more and more coal falls, a stockpile is created as a mound with sloping sides. This process produces a high output of dust as the dust separates from the courser chunks in free fall in which the coarse materials makes contact with other chunks, with the side of the chute, with the ground, or with the top of the stockpile.

Attempts have been made to deal with this dust problem. Many prior art devices employ some form of telescopic or accordion-like chute through which the coal falls from the conveyor to the stockpile. The end of the chute is raised as the height of the stockpile increases. Level sensors sense the distance between the bottom of the device and the stockpile and provide a control signal to a lifting apparatus.

The vast majority of prior art devices use a fan and filtration system generally called baghouse or dust collector, to control the dust. The dust-laden air near the end of a chute is drawn upward through an annular duct between the chute and a larger concentric chute and then sent to a filtration system where the dust is removed from the air. (Richardson et al., U.S. Pat. No. 3,241,581). Some of these devices use a flexible hood or skirt attached to the bottom of the chute. This flexible hood or skirt keeps the dust from escaping the area below the chute except through holes or spaces in the top of the hood which lead to an annular duct. This annular duct leads to a dust filtration system. (Garnett, U.S. Pat. No. 3,867,969; Bliss, U.S. Pat. No. 4,727,913). Another device has air inlets on the sides of the hood to draw air through the hood up into the annular duct and eventually to the dust filtration system. (Higashinaka et al., U.S. Pat. No. 4,061,221). Yet another device uses an inverted "V" shape hood device to form-fit the stockpile and mould it at a fixed angle as dust is sucked up from the hood through the annular duct and into a dust filtration system. (Hyodo, JP Pat. No. 357170302). Another device employs a non-vertical sloped chute and pumps the dust-laden air from the end of the chute back into the chute and then conveys the dust through the top portion of the chute and up to a dust filtration system. (Kaufmann, U.S. Pat. No. 3,739,893).

These filtration devices use a fan or vacuum to create a negative air pressure in the annular duct of the filtration system. In the filtration system, the dust-laden air passes through a filter which removes the suspended particles from the flowing air. The filtered air is then released to the outside environment.

Filtration systems are disadvantageous for several reasons. First, high capital costs are associated with adding a filtration system to a bulk material stacking chute. A duct system must be incorporated, usually by adding an entirely new chute around an existing chute to create an annular duct through which to draw the dust-laden air. This adds cost to the system and causes design and operational problems. Second, filtration systems require a high level of maintenance to keep them in working order. The particulate bulk material caught by the filter must be removed from the filter periodically using a shaker, positive air pressure release, or other device. Also, the entire filter must be periodically replaced in order to maintain the filtration system's efficiency level. This, too, adds to the expense of choosing a filtration system. Third, filtration systems consume high amounts of energy in order to run a vacuum or fan to create the negative pressure within the annular duct. Finally, a filtration system that is not working properly or not maintained emits dust into the atmosphere.

Another device attempts to prevent dust from blowing away in the wind without using a fan or filtration system. (Ortlip et al., U.S. Pat. No. 3,738,464). This device attempts to control dust emissions by attaching a boot onto the end of the chute. This flexible boot form-fits the shape of the stockpile, and grooms the pile at a fixed angle as the chute is raised. However, such an apparatus requires strength in the lower end of the chute to allow the bulk material to stack up inside of it. This apparatus also allows no room for the dust to settle and potentially allows the dust to be expelled back through the top of the chute and into the atmosphere.

Although these prior art devices work, none of them employs an apparatus that completely encloses the dust-laden air with enough space to allow the dust to settle out onto the top of the stockpile without the use of an expensive and complicated filtration system. There is a great need for an inexpensive and maintenance-free dust control system.

Lastly, there is a common solution implemented routinely which is the application of water, sometimes combined with chemical surfactants or foams, to suppress the dust. This involves rotating pumps, spray heads and other high maintenance equipment. Also, the chemicals often mixed with the water, are very expensive and an ongoing operating expense. Moreover, with coal, adding moisture drive the Btu (thermal) value of the coal.

SOLUTION

The above and other problems are solved and an advance in the art is made by the provision of a Dustless Stacker hood system, made of any suitable material, embodying the present invention. Dust-laden air over a stockpile is not only sealed off from the outside environment, but also confined by a Dustless Stacker hood to allow the dust to reach a high concentration and precipitate within the Dustless Stacker hood.

In use, the Dustless Stacker hood of the present invention receives falling chunks of coal from an overhead chute. These chunks of coal fall onto a stockpile below the hood and create high amounts of dust within the hood. The Dustless Stacker hood confines this dust underneath and within the hood and prevents the dust from escaping from the hood to the outside environment. As the dust concentration increases within the hood, the dust reaches a saturation point and it begins to agglomerate. During the agglomeration process, fine particles of dust stick together to form larger particles. The particles increase in size until they become large enough to fall to the surface of the stockpile and are covered by newly-fallen coal.

Unlike the prior art devices that either pump dust-laden air to an external filtration system or allow no space at the end of the chute for dust-laden air to become trapped and accumulate, the Dustless Stacker hood of the present invention confines the dust-laden air over the stockpile with enough volume to allow the dust to agglomerate. The Dustless Stacker hood resembles an upside-down opened can and has a diameter larger than the diameter of the chute through which the bulk material falls into the hood. This larger diameter ensures an adequate volume between the column of falling coal and the inner wall of the Dustless Stacker hood to enable the suspended dust to accumulate and eventually agglomerate. This cavity of space within the hood facilitates a swirling action of the dust-laden air. This is caused by the frictional drag of the falling material in the center of the Dustless Stacker hood. This swirling action enhances the agglomeration process by encouraging the dust particles to collide, stick together, and fall to the top of the stockpile. The present invention, unlike the prior art devices, retains the dust between the chute and the stockpile by relying on the simpler and less expensive method of agglomeration to remove the dust from the air.

An alternative embodiment of the present invention features a Dustless Stacker recirculation apparatus comprising one or more recirculation pipes. This recirculation pipe extends from the top of the Dustless Stacker hood to the chute containing the falling coal. The recirculation pipe utilizes the low pressure created by the falling coal in the chute to draw the dust-laden air from the top of the Dustless Stacker hood and through the recirculation pipe back to the falling coal in the chute. This enhances the agglomeration process, and aids both agglomerated and non-agglomerated particles to be smothered in the stockpile by larger chunks of coal. This recirculation pipe allows the dust to be transferred back into the falling coal and eventually into the stockpile without the use of a vacuum or fan motor, and without the need to filter out the dust before reintroducing it into the system.

The present invention prevents dust from being emitted to the outside environment without the use of the apparatus and methods of the prior art. These and other advantages of the Dustless Stacker hood will be apparent to those skilled in the art upon reading of the discussion below in combination with the accompanying drawings.

ASPECTS

An aspect of the invention is a Dustless Stacker hood for suppressing dust generated during stockpiling of bulk material received from a chute, the Dustless Stacker hood comprising:
- a top plate with a first diameter greater than a second diameter of said chute;
- a first hole in the center of said top plate, said first hole is configured to receive falling bulk material from said chute;
- an outer wall affixed perpendicularly to the perimeter of said top plate, said outer wall and said top plate are configured to enclose and confine dust within said stacker hood so as to prevent said dust from escaping from within said stacker hood to the outside environment; and
- a sealing ring affixed to the perimeter of the bottom of said outer wall, said sealing ring is configured to remain proximate to surface of a stockpile of bulk material and to prevent dust from escaping below said outer wall and said sealing ring into said outside environment.

Preferably a second hole in a side wall of said chute;
a third hole in said top plate; and
a recirculation pipe connected between said second hole and said third hole, said recirculation pipe is configured to draw dust-laden air through said third hole, into said recirculation pipe, and through said second hole and into said chute in response to a pressure differential created by bulk material dropping past said second hole in said chute.

Preferably additional holes in a side wall of said chute;
additional holes in said top plate; and
recirculation pipes connected between said additional holes in said side walls and said additional holes in said chute, said recirculation pipe is configured to draw dust-laden air through said additional holes in said side wall, into said recirculation pipes, and through said additional holes in said chute in response to a pressure differential created by bulk material dropping past said additional holes in said chute.

Preferably recirculation means connected between openings in said top plate and openings in said chute;
said recirculation means is effective to draw dust-laden air through said openings in said top plate, into said recirculation means and through said openings in said chute to the interior of said chute in response to a pressure differential between the interior of said chute and the interior of said Dustless Stacker hood created by bulk material dropping past openings is said chute.

Preferably said chute;
a recirculation tube concentric with and surrounding said chute;
a recirculation path defined by the space between the inner wall of said recirculation tube and the outer wall of said chute;
said recirculation tube draws dust-laden air through said openings in said top plate, into said recirculation path, and through said openings in said chute and through said chute back to the interior of said Dustless Stacker hood in response to a pressure differential between the interior of said chute and the interior of said Dustless Stacker hood created by bulk material dropping past said openings in said chute.

Preferably said chute is telescopic said first diameter of said top plate is substantially larger than said second diameter of said chute such that volume of air within said Dustless Stacker hood is large enough to permit suspended dust particles to agglomerate.

Preferably said chute is a telescopic chute.

Preferably said chute is an accordion-like chute adapted to be expandable.

Preferably a level sensor configured to measure and control a distance between said stockpile and said Dustless Stacker hood.

Preferably said top plate is circular and said outer wall forms a cylindrical hood.

Preferably said top plate is rectangular and said outer wall forms a boxed hood.

Preferably said outer wall forms a conical hood.

Preferably said sealing ring is flared outwardly at an angle with respect to vertical surface of said outer wall.

Preferably said sealing ring is further configured to remain proximate to a flat surface onto which said stockpile is made.

Preferably at least one filter in said surface of said top plate enables air pressure inside said Dustless Stacker hood to escape to the outside environment while preventing coal dust within said Dustless Stacker hood from escaping.

Another aspect of the invention is a method of operating an apparatus for suppressing dust through agglomeration during the stockpiling of bulk material, said apparatus comprises a chute connected to a top surface of a Dustless Stacker hood which comprises a top plate and an outer wall and a sealing ring, the method comprising the steps of:

receiving bulk material from said chute through a first hole in said top plate, said top plate having a first diameter greater than a second diameter of said chute;

generating dust within said Dustless Stacker hood as said bulk material falls from said chute through said first hole and onto a stockpile;

confining said dust within a said Dustless Stacker hood having said sealing ring affixed to the bottom perimeter of said outer wall;

increasing concentration of dust particles within said Dustless Stacker hood to a saturation concentration such that said dust agglomerates when said dust particles collide, stick together to form agglomerated particles, and fall onto said stockpile; and covering said agglomerated particles on said stockpile with newly fallen bulk material.

Preferably said method further includes the step of swirling dust-laden air within said Dustless Stacker hood with air currents induced by falling bulk material to enhance an agglomeration process.

Preferably said method further includes the step of creating a low pressure area over a second hole in side wall of said chute as bulk material falls past said second hole to create a downward airflow proximate said second hole;

affixing a recirculation pipe between said second hole and a third hole located on said top plate; and drawing dust-laden air out of said Dustless Stacker hood through said third hole, through said recirculation pipe, and through said second hole back into said chute using a pressure differential created by said low pressure area.

Preferably said method further includes the step of said first diameter is substantially larger than said second diameter, the method further comprising the steps of:

suspending dust particles in air within said hood until said dust particles reach a saturation concentration in said air;

agglomerating said dust particles by causing said dust particles to stick together with other dust particles; and covering fallen agglomerated particles with newly falling bulk material.

Preferably said method further includes the steps of:

receiving bulk material from said chute through a first hole in said top plate, said top plate having a first diameter greater than a second diameter of said chute;

generating dust within said Dustless Stacker hood as said bulk material falls through said first hole and onto a stockpile;

confining said dust within a said Dustless Stacker hood by said sealing ring affixed to the bottom perimeter of said outer wall;

increasing the concentration of dust particles within said hood to a saturation concentration such that said dust agglomerates when said dust particles collide, stick together to form agglomerated particles, and fall onto said stockpile; and covering said agglomerated particles on said stockpile with newly fallen bulk material.

Preferably said method further includes the step of:

swirling dust-laden air within said hood with air currents induced by falling bulk material to enhance an agglomeration process.

Preferably said method further includes the steps of:

creating a low pressure area over a second hole in side wall of said chute as bulk material falls past said second hole to create a downward airflow proximate said second hole;

affixing a recirculation pipe between said second hole and a third hole located on said top plate; and drawing dust-laden air out of said Dustless Stacker hood through said third hole, through said recirculation pipe, and through said second hole back into said chute using a pressure differential created by said low pressure area.

Preferably said first diameter is substantially larger than said second diameter, the method further comprising the steps of:

suspending dust particles in air within said hood until said dust particles reach a saturation concentration in said air;

agglomerating said dust particles by causing said dust particles to stick together with other dust particles; and covering fallen agglomerated particles with newly falling bulk material.

DETAILED DESCRIPTION

Figure 1:
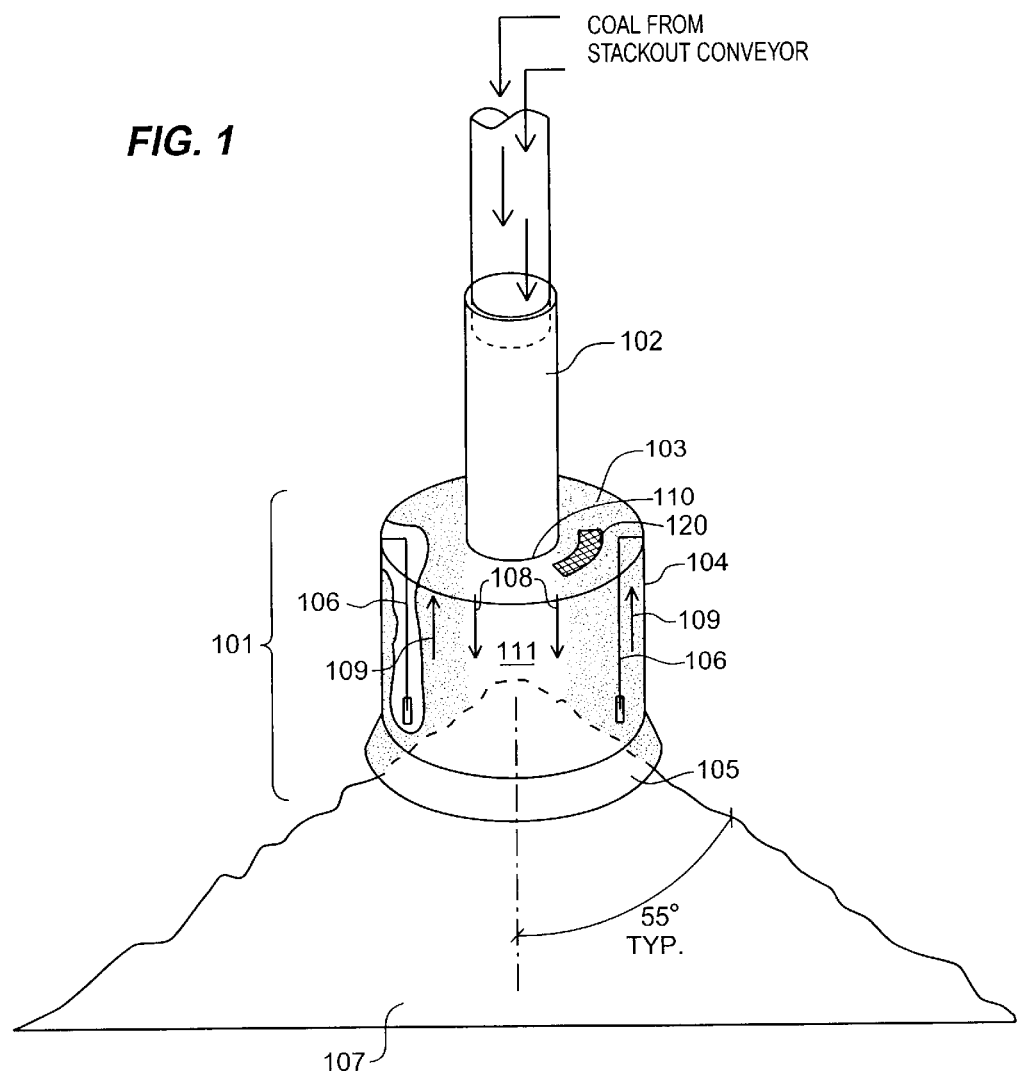
FIG. 1 illustrates an exterior view of one possible preferred exemplary embodiment of the present invention.

Description of FIG. 1

FIG. 1 illustrates a Dustless Stacker system including Dustless Stacker hood 101. Coal or other dust-producing material falls through telescopic chute 102, passes into inlet hole 110 of Dustless Stacker hood 101 and falls onto top of a stockpile of material 107.

Dustless Stacker hood 101 includes circular top plate 103, cylindrical outer wall 104, and sealing ring 105. Circular top plate 103 comprises the top of the Dustless Stacker hood 101 and has a hole 110 at its center having the same diameter as the bottom of telescopic chute 102. Top plate 103 is affixed to telescopic chute 102 around center hole 110 to provide an airtight seal between Dustless Stacker hood 101 and telescopic chute 102. This allows coal to fall down telescopic chute 102 into Dustless Stacker hood 101. Cylindrical outer wall 104 of Dustless Stacker hood 101 is affixed perpendicularly to the perimeter of circular top plate 103 to form an airtight can-shape member which opens downwardly. A sealing ring 105, preferably constructed of rubber (such as 40 durometer rubber), connects to the bottom of cylindrical outer wall 104. Sealing ring 105 is flared outward at an angle with respect to the perpendicular surface of cylindrical outer wall 104. This forms a cone shape opening on the bottom of Dustless Stacker hood 101.

In use, sealing ring 105 remains proximate the top surface of stockpile 107. This permits little or no dust within Dustless Stacker hood 101 to escape to the environment beyond Dustless Stacker hood 101. As coal falls down telescopic chute 102, it creates a column of falling material 111 in the center of Dustless Stacker hood 101. This column of falling material 111 is below the hole 110 in the top plate 110 of Dustless Stacker hood 101. This area below hole 110 is where material falls before it contacts stockpile 107. This creates dust as solid chunks of coal contact each other, contact the side of the chute 102, and contact the top of stockpile 107. Much of the dust is fine enough to be suspended in air. Dustless Stacker hood 101 confines the dust between column of falling material 111 and cylindrical wall 106 of Dustless Stacker hood 101.

The diameter of Dustless Stacker hood 101 is larger than the diameter of the telescopic chute 102, the volume and configuration is determined in consideration of various parameters:

1. Type of material
2. Velocity of fall
3. Fall distance of material
4. Mass flow rate
5. Moisture content
6. Gradation of material
7. Induced air flow from material stream
8. and other characteristics.

The internal volume of the Dustless Stacker must be large enough to facilitate the agglomeration process. This leaves enough volume for the dust to accumulate in air inside Dustless Stacker hood 101. As the suspended dust reaches a saturation concentration within Dustless Stacker hood 101, the dust begins to agglomerate as finer particles stick together to form larger particles. These larger particles fall to the surface of stockpile 107 and are soon covered over by newly falling coal. Other alternative shapes and diameters of Dustless Stacker hood 101 are possible, as long as the diameter of Dustless Stacker hood 101 is larger than the diameter of the telescopic chute 102 and allows enough room for suspended dust to agglomerate and fall to the top of stockpile 107.

Another phenomenon occurs within the cavity between column of falling material 111 and the walls of the Dustless Stacker hood 101. The column of falling material 111 imparts a frictional drag on the surrounding air and induces a downward airflow at the outer edge of the column 111 as shown by arrows 108. This, in turn, produces upward airflow near the cylindrical outer wall 104 of Dustless Stacker hood 101, as shown by arrows 109. This induced airflow creates a swirling effect on the dust-laden air. This enhances the agglomeration process by increasing the likelihood that dust particles will collide, stick together, and fall to the surface of stockpile 107 before being covered up by falling coal.

As the height of stockpile 107 increases, Dustless Stacker hood 101 is raised incrementally to allow stockpile 107 to grow and to prevent Dustless Stacker hood 101 from clogging. Level sensor 106 located within the Dustless Stacker hood 101 provides a signal indicating when the stacker hood 101 must be raised because the level of stockpiled coal within stacker hood 101 has grown too high. This signal is relayed to a lifting apparatus (not shown) which raises Dustless Stacker hood 101 vertically to maintain the peak of stockpile 107 within hood 101 at the proper level. Level sensor 106 may operate on sonar radar or any other suitable means for measuring distance.

Figure 2:
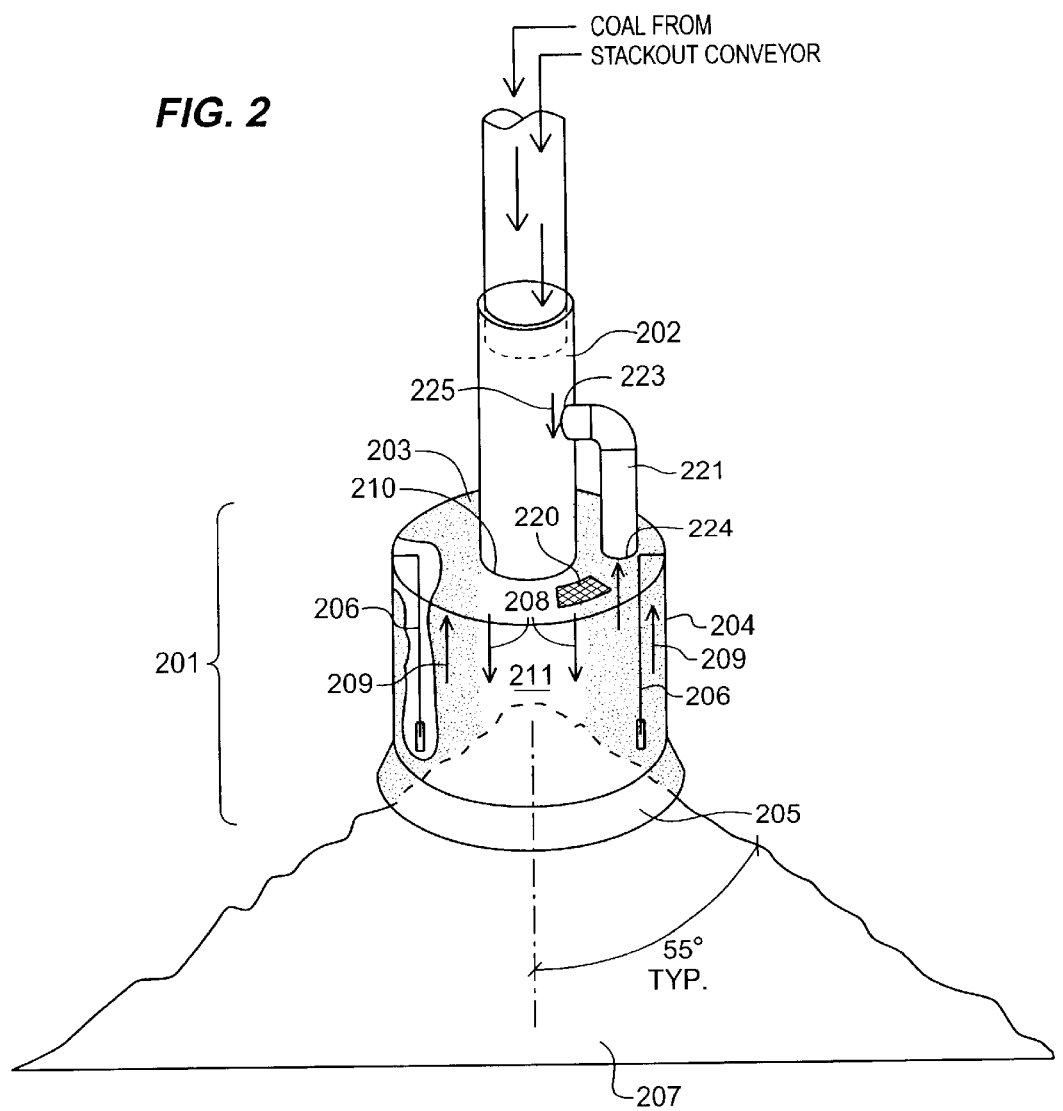
FIG. 2 illustrates an exterior view of an alternative possible preferred exemplary embodiment of the present invention.

Description of FIG. 2

FIG. 2 illustrates an exterior view of an alternative embodiment of Dustless Stacker hood 201. This embodiment is similar to FIG. 1, except that it includes a Dustless Stacker recirculation pipe 221. The circular top plate 203 of Dustless Stacker hood 201 on FIG. 2 has a hole 224 located between the outer circumference of hole 210 and the circumference of circular top plate 203. In addition, telescopic chute 202 has a hole 223 in its side. Recirculation pipe 221 interconnects holes 223 and 224 and forms an airtight seal over each hole.

As the coal in telescopic chute 202 falls, it imparts a frictional drag on the surrounding air. This induces a downward airflow proximate hole 223 in telescopic chute 202. This downward airflow, shown by arrow 225, creates a region of low pressure proximate hole 223 in telescopic chute 202. The higher-pressure, dust-laden air within Dustless Stacker hood 201 is drawn toward hole 224 in the top of circular plate 203, as shown by arrow 209. The dust-laden air travels through recirculation pipe 221 and back into the falling material within telescopic chute 202. The falling coal creates a suction at hole 223 that draws the dust-laden air within Dustless Stacker hood 201 into hole 224 and through the recirculation pipe 221 and back into the stream of falling coal. This recirculation of the dust-laden air further enhances the agglomeration process by further increasing movement of the dust-laden air. By increasing the movement of the dust-laden air, the dust particles are more likely to make contact with each other, stick together, and fall to the top of stockpile 207. Reintroducing the dust-laden air into telescopic chute 202 also increases the likelihood that both the agglomerated and non-agglomerated particles will be covered by the stream of falling coal.

Filters 120 and 220 on FIGS. 1 and 2 are positioned in top plates 103 and 203 to enable pressurized air to escape from within Dustless Stacker hood while confining the generated coal dust within the interior of said Dustless Stacker hood. However, if desired, the filter may be omitted in installations in which its use is not necessary to prevent air and coal dust from escaping. The filters must be sized so as to not impair the agglomeration process. The minimum size of the filter is that required to prevent air from escaping, if any. The maximum size of the filter is that which will not degrade the agglomeration process.

Figure 3:
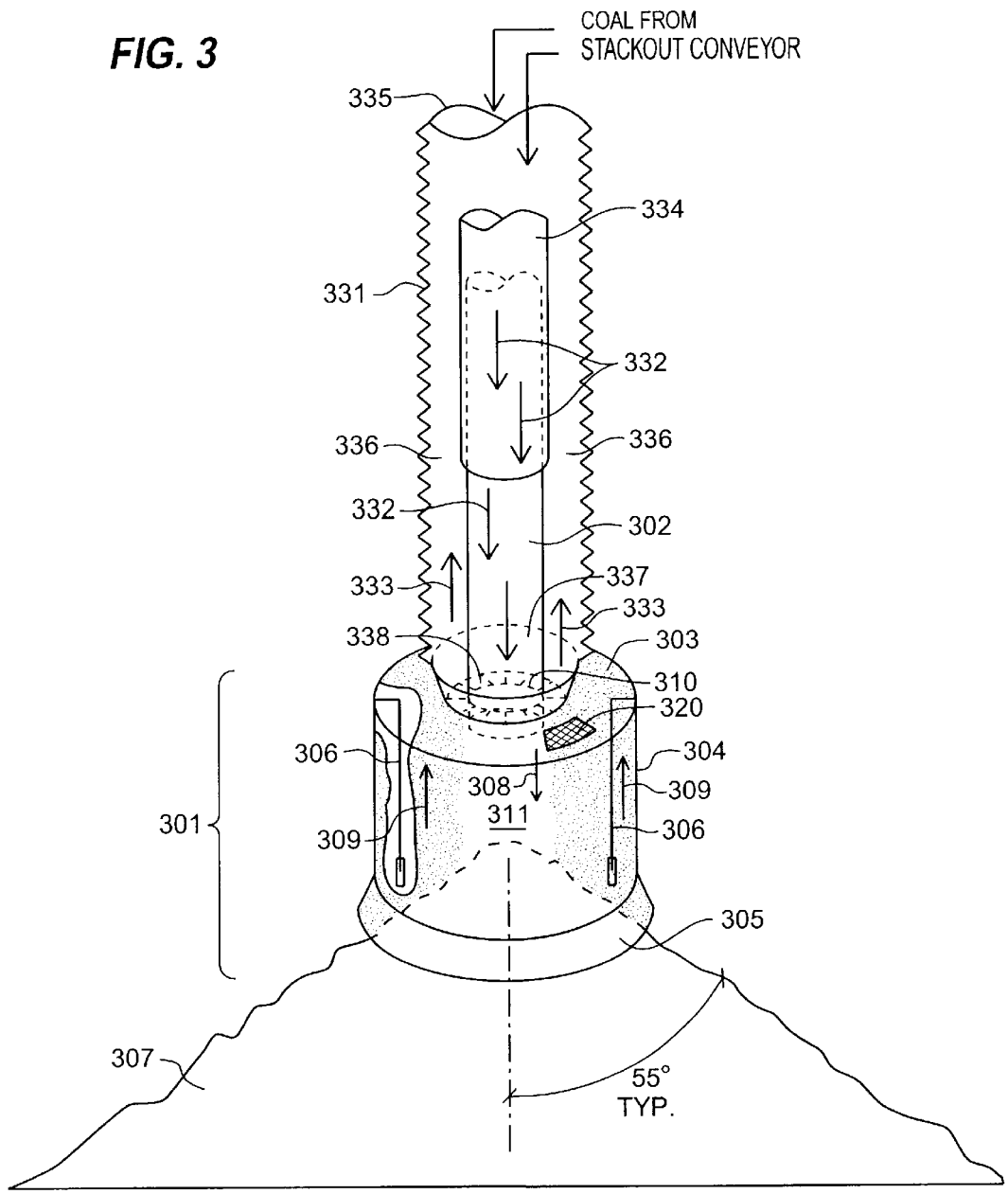
FIGS. 3 and 4 illustrate another possible preferred exemplary embodiment.
Figure 4:
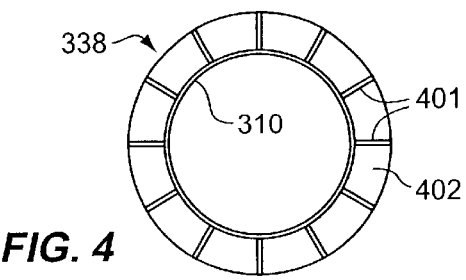

Description of FIGS. 3 and 4

FIG. 3 discloses an alternative embodiment somewhat similar to that of FIGS. 1 and 2. The embodiment of FIG. 3 is similar to that of FIG. 2 in that it provides for the recirculation of swirling dust in the Dustless Stacker hood 304. In FIG. 2, the swirling dust is extended upward through recirculation pipe 221 and back into chute 202 for return to Dustless Stacker hood 204. As mentioned, the embodiment of FIG. 2 may use, if desired, a plurality of recirculation pipes 221 to facilitate the agglomeration. FIG. 3 is similar to that of FIG. 2 in that it also provides for the upward recirculation of dust from Dustless Stacker hood 304. However, the embodiment of FIG. 3 does not use discreet recirculation pipes 221. The embodiment of FIG. 3 includes a dust cover 331 which is concentric with and surrounds telescopic chute elements 302 and 334. A space 336 exists between the inner wall of dust cover 331 and the outer wall of telescopic chute elements 302 and 334. Grid element 338 is positioned in the center hole 310 of Dustless Stacker hood 304. Grid element 338 is annular and has a plurality of wire-like divider elements 401 as shown on FIG. 4 where grid-like element 338 is shown in further detail. The plurality of divider elements 401 define spaces 402 through which dust can travel upward as shown in FIG. 3 with the upward travel represented by arrows 333. Funnel shaped element 337 has its lower surface affixed to the outer perimeter of grid 336 as shown on FIG. 3. The upper extremity of element 337 is flared outwardly so as to entrap any falling bulk material and permit the bulk material to drop through the openings 402 of element 338.

In operation, the bulk material is received by chute elements 334 and 302 through which the bulk material falls downwardly into the interior of Dustless Stacker hood 304. This falling material creates swirling dust as described in connection with FIGS. 1 and 2. The swirling dust swirls within Dustless Stacker hood 304 as described priorly and agglomerates. However, in the agglomeration process, a portion of the swirling dust may extend upwardly as shown by arrows 333 in the space 336 between the inner portion of dust cover 331 and the outer surface of telescopic chutes 302, 334. This dust is drawn upwardly by the pressure differential between the air of the upper portion of the telescopic chute and the air pressure within Dustless Stacker hood 304. On FIG. 3, the dust proceeds upwardly until it reaches the top portion of chute element 334 where it may then be drawn back into the interior of the chute and fall downwardly to recirculate back to the Dustless Stacker hood 304. Alternatively, some of the dust may not be drawn to the upper portion of the telescopic chute and may fall back downwards through grid openings 402 back into the Dustless Stacker hood 304 to re-enter the agglomeration process.

The dust cover 331 is shown as a longitudinally flexible corrugated element which enables it to expand axially as the telescopic chute 302, 334 is raised as the height of the coal stockpile is raised.

It is to be understood that the claimed invention is not limited to the description of the preferred embodiment, but encompasses other modifications and alterations within the spirit and scope of the inventive concept. For example, a fluid dynamics based program may be used, if desired, to determine the volume and dimensions of the Dustless Stacker hood 101 and 201 and the size and dimensions of filters 120 and 220. Also, the diameter of Dustless Stacker hood 101 and 201 may be varied, as long as the minimum inner diameter of Dustless Stacker hood 201 is larger than the maximum inner diameter of the telescopic chute 102 and 202 to allow enough volume for suspended dust to agglomerate and fall to the top of stockpile 107 and 207. The term "diameter" carries its common meaning for circular items, but "diameter" also means "thickness or width," *The American Heritage Dictionary of the English Language* 501 (4th ed. 2000), for non-circular items. For example, the diameter of a square-cross-sectioned chute means the width between opposite side walls of the chute. Use of the present invention is not limited to use with a telescopic chute 102 and 202, but includes use with any type of chute, of any cross-sectional shape, for enclosing material such as coal as it falls downward. Also, the geometry of Dustless Stacker hood 101 and 201 may differ. For example, other downward-opening geometric shapes may be used, such as a cone-shape, box-shape, or a bell-shape. Use of the present invention is also not limited to use in stockpiling coal. The present invention may also be used during stockpiling of any bulk material that produces dust including, but not limited to, rock, cement, and other ores. In other embodiments, Dustless Stacker recirculation pipe 201 and 221 may also be affixed to telescopic chute 102 and 202 at different distances from the top of Dustless Stacker hood 201, and recirculation pipe 221 may also be affixed to Dustless Stacker hood 101 and 201 at various locations on the top or sides of hood 101 and 201.

What is claimed is:

1. A Dustless Stacker hood for suppressing dust generated during stockpiling of bulk material received from a chute, the Dustless Stacker hood comprising:

a top plate with a diameter greater than the diameter of said chute;

a first hole in the center of said top plate, said first hole is configured to receive falling bulk material from said chute;

an outer wall affixed perpendicularly to the perimeter of said top plate, said outer wall and said top plate are configured to enclose and confine dust within said stacker hood so as to prevent said dust from escaping from within said stacker hood to the outside environment; and a sealing ring affixed to the perimeter of the bottom of said outer wall, said sealing ring is configured to remain proximate to the surface of a stockpile of bulk material to prevent dust from escaping from said Dustless Stacker hood below said outer wall and said sealing ring into said outside environment.

2. The Dustless Stacker hood of claim 1, further comprising:

a second hole in a side wall of said chute;

a third hole in said top plate; and a recirculation pipe connected between said second hole and said third hole, said recirculation pipe is configured to draw dust-laden air through said third hole, into said recirculation pipe, and through said second hole and into said chute in response to a pressure differential created by bulk material dropping past said second hole in said chute.

3. The Dustless Stacker hood of claim 2, further comprising:

additional holes in a side wall of said chute;

additional holes in said top plate; and recirculation pipes connected between said additional holes in said side wall and said additional holes in said top plate, said recirculation pipe is configured to draw dust-laden air through said additional holes in said top plate wall, into said recirculation pipes, and through said additional holes in said chute in response to a pressure differential created by bulk material dropping past said additional holes in said chute.

4. The Dustless Stacker hood of claim 1 further comprising:

recirculation means connected between openings in said top plate and openings in said chute;

said recirculation means is effective to draw dust-laden air through said openings in said top plate, into said recirculation means and through said openings in said chute to the interior of said chute in response to a pressure differential between the interior of said chute and the interior of said Dustless Stacker hood created by bulk material dropping past openings is said chute.

5. The Dustless Stacker hood of claim 1 characterized in that said recirculation means comprises:
   dust cover concentric with and surrounding said chute;
   a recirculation path defined by the space between the inner wall of said dust cover and the outer wall of said chute;
   said dust cover draws dust-laden air through openings in said top plate, into said recirculation path, and through at least one opening in said chute and through said chute back to the interior of said Dustless Stacker hood in response to a pressure differential between the interior of said chute and the interior of said Dustless Stacker hood created by bulk material dropping past said at least one opening in said chute.

6. The Dustless Stacker hood of claim 1 wherein said chute is telescopic wherein said first diameter of said top plate is substantially larger than said second diameter of said chute such that volume of air within said Dustless Stacker hood is sufficiently large to permit suspended dust particles to agglomerate.

7. The Dustless Stacker hood of claim 1 wherein said chute is a telescopic chute.

8. The Dustless Stacker hood of claim 1 wherein said chute is an expandable accordion-like chute.

9. The Dustless Stacker hood of claim 1 further comprising:
   a level sensor configured to measure and control a distance between said stockpile and said Dustless Stacker hood.

10. The Dustless Stacker hood of claim 1 wherein said top plate is circular and said outer wall forms a cylindrical hood.

11. The Dustless Stacker hood of claim 1 wherein said top plate is rectangular and said outer wall forms a boxed hood.

12. The Dustless Stacker hood of claim 1 wherein said outer wall forms a conical hood.

13. The Dustless Stacker hood of claim 1 wherein said sealing ring is flared outwardly at an angle with respect to vertical surface of said outer wall.

14. The Dustless Stacker hood of claim 1 wherein said sealing ring is further configured to remain proximate to a flat surface onto which said stockpile is made.

15. The Dustless Stacker hood of claim 1 further including:
   at least one filter in said surface of said top plate enables air pressure inside said Dustless Stacker hood to escape to the outside environment while preventing coal dust within said Dustless Stacker hood from escaping.

16. A method of operating an apparatus for suppressing dust through agglomeration during the stockpiling of bulk material, said apparatus comprises a chute connected to a top surface of a Dustless Stacker hood which comprises a top plate and an outer wall and a sealing ring, the method comprising the steps of:
   receiving bulk material from a chute through a first hole in said top plate, said top plate having a first diameter greater than a second diameter of said chute;
   generating dust within said Dustless Stacker hood as said bulk material falls from said chute through said first hole and onto a stockpile;
   confining said dust within a said Dustless Stacker hood having said sealing ring affixed to the bottom perimeter of said outer wall;
   increasing concentration of dust particles within said Dustless Stacker hood to a saturation concentration such that said dust agglomerates when said dust particles collide, stick together to form agglomerated particles, and fall onto a stockpile; and
   covering said agglomerated particles on said stockpile with newly fallen bulk material.

17. The method of claim 16, further comprising the step of:
   swirling dust-laden air within said Dustless Stacker hood with air currents induced by falling bulk material to enhance an agglomeration process.

18. The method of claim 16, further comprising the steps of:
   creating a low pressure area over a second hole in a side wall of said chute as bulk material falls past said second hole to create a downward airflow proximate said second hole;
   affixing a recirculation pipe between said second hole and a third hole located on said top plate; and
   drawing dust-laden air out of said Dustless Stacker hood through said third hole, through said recirculation pipe, and through said second hole back into said chute using a pressure differential created by said low pressure area.

19. The method of claim 16 wherein said first diameter is substantially larger than said second diameter, the method further comprising the steps of:
   suspending dust particles in air within said hood until said dust particles reach a saturation concentration in said air;
   agglomerating said dust particles by causing said dust particles to stick together with other dust particles; and
   covering fallen agglomerated particles with newly falling bulk material.

20. A method of operating the Dustless Stacker hood of claim 1; said method comprising the steps of:
   receiving bulk material from said chute through a first hole in said top plate, said top plate having a first diameter greater than a second diameter of said chute;
   generating dust within said Dustless Stacker hood as said bulk material falls through said first hole and onto a stockpile;
   confining said dust within a said Dustless Stacker hood by said sealing ring affixed to the bottom perimeter of said outer wall;
   increasing the concentration of dust particles within said hood to a saturation concentration such that said dust agglomerates when said dust particles collide, stick together to form agglomerated particles, and fall onto said stockpile; and
   covering said agglomerated particles on said stockpile with newly fallen bulk material.

21. The method of claim 20, further comprising the step of:
   swirling dust-laden air within said hood with air currents induced by falling bulk material to enhance an agglomeration process.

22. The method of claim 20, further comprising the steps of:
   creating a low pressure area over a second hole in a side wall of said chute as bulk material falls past said second hole to create a downward airflow proximate said second hole;
   affixing a recirculation pipe between said second hole and a third hole located on said top plate; and
   drawing dust-laden air out of said Dustless Stacker hood through said third hole, through said recirculation pipe, and through said second hole back into said chute using a pressure differential created by said low pressure area.

23. The method of claim 20 wherein said first diameter is substantially larger than said second diameter, the method further comprising the steps of:

suspending dust particles in air within said hood until said dust particles reach a saturation concentration in said air;

agglomerating said dust particles by causing said dust particles to stick together with other dust particles; and covering fallen agglomerated particles with newly falling bulk material.

* * * * *